US012584012B2

(12) United States Patent
Yamamoto et al.

(10) Patent No.: US 12,584,012 B2
(45) Date of Patent: Mar. 24, 2026

(54) INORGANIC FILLER DISPERSION STABILIZER, INORGANIC FILLER-CONTAINING RESIN COMPOSITION, MOLDED ARTICLE, AND ADDITIVE

(71) Applicant: DIC Corporation, Tokyo (JP)

(72) Inventors: Junko Yamamoto, Ichihara (JP); Hiroshi Yoshimura, Ichihara (JP); Yusuke Tajiri, Ichihara (JP)

(73) Assignee: DIC Corporation, Tokyo (JP)

( * ) Notice: Subject to any disclaimer, the term of this patent is extended or adjusted under 35 U.S.C. 154(b) by 568 days.

(21) Appl. No.: 17/912,194

(22) PCT Filed: Mar. 4, 2021

(86) PCT No.: PCT/JP2021/008355
§ 371 (c)(1),
(2) Date: Sep. 16, 2022

(87) PCT Pub. No.: WO2021/192883
PCT Pub. Date: Sep. 30, 2021

(65) Prior Publication Data
US 2023/0133719 A1 May 4, 2023

(30) Foreign Application Priority Data
Mar. 25, 2020 (JP) ................................. 2020-054256

(51) Int. Cl.
*C08L 67/02* (2006.01)
*C08K 3/26* (2006.01)
(Continued)

(52) U.S. Cl.
CPC ................ *C08L 67/02* (2013.01); *C08K 3/26* (2013.01); *C08K 5/0016* (2013.01); *C08L 75/04* (2013.01); *C08K 2003/265* (2013.01)

(58) Field of Classification Search
CPC .......... C08L 67/02; C08L 75/04; C08L 33/02; C08L 67/00; C08L 77/12; C08L 101/00;
(Continued)

(56) References Cited

U.S. PATENT DOCUMENTS 3,778,287 A 12/1973 Stansfield et al.
4,797,440 A 1/1989 Schofield et al.
(Continued)

FOREIGN PATENT DOCUMENTS

CN 106589330 B 5/2019
FR 2259853 A1 8/1975
(Continued)

OTHER PUBLICATIONS

Kawamo, JP05170972-MT (Year: 1993).*
Takahashi, JP2013095758-MT (Year: 2013).*
Kondo, JP2014141550-MT (Year: 2014).*

*Primary Examiner* — Mark Eashoo
*Assistant Examiner* — Zhen Liu
(74) *Attorney, Agent, or Firm* — Troutman Pepper Locke LLP; James E. Armstrong, IV; Nicholas J. DiCeglie, Jr.

(57) ABSTRACT

To provide an inorganic filler dispersion stabilizer capable of reducing the viscosity of a composition containing an inorganic filler and improving the storage stability of the composition containing an inorganic filler. An inorganic filler dispersion stabilizer which is a polyester having carboxyl groups at both terminals.

18 Claims, 1 Drawing Sheet

(51) Int. Cl.
*C08K 5/00* (2006.01)
*C08L 75/04* (2006.01)

(58) Field of Classification Search
CPC .. C08K 3/26; C08K 5/0016; C08K 2003/265; C08K 2003/2227; C08K 2003/282; C08K 2003/385; C08K 3/013; C08K 5/20; C08G 63/16; C08G 63/91; C08G 63/64; C08G 63/66
See application file for complete search history.

(56) References Cited

U.S. PATENT DOCUMENTS

| | | | |
|---|---|---|---|
| 11,427,674 | B2 | 8/2022 | Tajiri et al. |
| 2019/0382527 | A1 | 12/2019 | Tajiri et al. |
| 2022/0041858 | A1 | 2/2022 | Noro et al. |

FOREIGN PATENT DOCUMENTS

| | | | | |
|---|---|---|---|---|
| JP | S54-34009 | B1 | | 10/1979 |
| JP | 05170972 | A | * | 7/1993 |
| JP | 2001-019734 | A | | 1/2001 |
| JP | 2008-019368 | A | | 1/2008 |
| JP | 2011-079935 | A | | 4/2011 |
| JP | 2013095758 | A | * | 5/2013 |
| JP | 2014141550 | A | * | 8/2014 |
| JP | 2019-189726 | A | | 10/2019 |
| WO | 2018/116812 | A1 | | 6/2018 |
| WO | 2020/066651 | A1 | | 4/2020 |

* cited by examiner

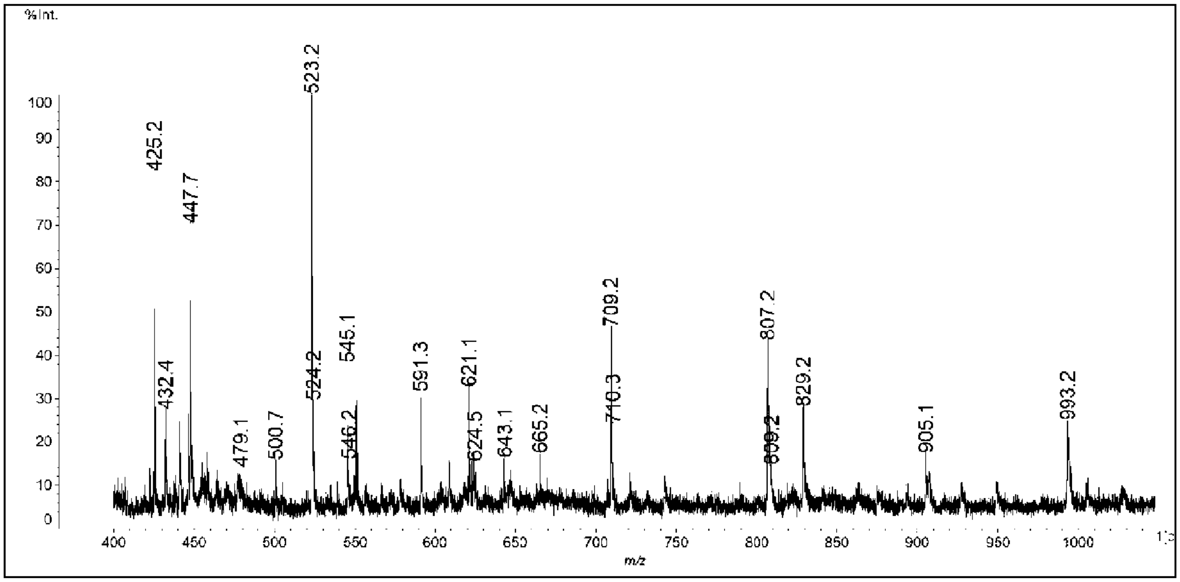
%Int.
100
90
80
70
60
50
40
30
20
10
0
523.2
425.2
447.7
432.4
479.1
500.7
524.2
545.1
546.2
591.3
621.1
624.5
643.1
665.2
709.2
710.3
807.2
808.2
829.2
905.1
993.2
400
450
500
550
600
650
700
750
800
850
900
950
1000
m/z

INORGANIC FILLER DISPERSION STABILIZER, INORGANIC FILLER-CONTAINING RESIN COMPOSITION, MOLDED ARTICLE, AND ADDITIVE

TECHNICAL FIELD

The present invention relates to an inorganic filler dispersion stabilizer, an inorganic filler-containing resin composition, a molded article, and an additive.

BACKGROUND ART

Building materials, automobile members, sanitary absorbent articles, stone paper, and the like are molded from a resin composition containing an inorganic filler, and various functions such as impact resistance, bending resistance, dimensional stability, and moisture permeability are imparted by the inorganic filler.

In order to enhance the functionality of the molded article and to reduce the cost by increasing the amount, it is required to further increase the filling amount of the inorganic filler. However, when the filling amount of the inorganic filler in the resin composition is increased, there is a problem that the fluidity of the resin composition is lowered and the moldability is lowered.

For example, in urethane waterproof flooring applications, calcium carbonate is generally used as an inorganic filler. However, when the filling amount of calcium carbonate is increased, there is a problem in that the viscosity is increased and the moldability and handleability are deteriorated.

As a method for increasing the content of the inorganic filler in the resin composition, a method of adding a viscosity reducing agent is adopted, and various viscosity reducing agents have been proposed (PTLs 1 and 2).

CITATION LIST

Patent Literature

PTL 1: JP-A-2011-079935
PTL 2: JP-A-54-34009

SUMMARY OF INVENTION

Technical Problem

The viscosity reducing agent coats the surface of the inorganic filler, thereby suppressing the interaction between the inorganic fillers and reducing the viscosity of the composition. On the other hand, when the viscosity of the composition is lowered, the inorganic filler is precipitated with the lapse of time to form an aggregate (hard cake) containing the inorganic filler, and there is a problem that the storage stability is significantly impaired.

In addition, the viscosity reducing agent may not exhibit a viscosity reducing effect depending on the type of the binder resin to be contained in the composition.

An object of the present invention is to provide an inorganic filler dispersion stabilizer capable of reducing the viscosity of a composition containing an inorganic filler and improving the storage stability of the composition.

Solution to Problem

As a result of intensive studies to solve the above problems, the present inventors have found that a polyester having a specific structure can reduce the viscosity of a resin composition containing an inorganic filler and improve the storage stability of the resin composition, and have completed the present invention.

That is, the present invention relates to an inorganic filler dispersion stabilizer which is a polyester having carboxyl groups at both terminals.

Advantageous Effects of Invention

According to the present invention, it is possible to provide an inorganic filler dispersion stabilizer capable of reducing the viscosity of a composition containing an inorganic filler and improving the storage stability of a composition containing an inorganic filler.

BRIEF DESCRIPTION OF DRAWINGS

FIG. 1 is a diagram showing measurement results of MALDI-TOFMS (matrix-assisted laser desorption ionization time-of-flight mass spectrometry) of a dispersion stabilizer C produced in Example 3.

DESCRIPTION OF EMBODIMENTS

Hereinafter, an embodiment of the present invention will be described. The present invention is not limited to the following embodiments, and can be carried out by appropriately adding modifications within a range not impairing the effects of the present invention.

[Inorganic Filler Dispersion Stabilizer]

The inorganic filler dispersion stabilizer of the present invention is a polyester having carboxyl groups at both terminals. Hereinafter, the inorganic filler dispersion stabilizer of the present invention may be referred to as "the dispersion stabilizer of the present invention", and the polyester which is the inorganic filler dispersion stabilizer of the present invention may be referred to as "the polyester of the present invention".

In the present invention, the term "dispersion stabilizer" means a component that is added to a composition containing an inorganic filler to prevent the inorganic filler in the composition from aggregating and precipitating.

In the polyester of the present invention, it is considered that one of the carboxyl groups at both terminals is adsorbed to the inorganic filler and the other carboxyl group is adsorbed to another inorganic filler, thereby forming a three dimensional network composed of the polyester and the inorganic filler.

It is considered that in a state where the shearing force is very small such as when the composition is stored, the form of the three dimensional network is maintained and the viscosity of the system is increased to suppress the precipitation of the inorganic filler, whereas in a state where the shearing force is large such as when the composition is used, the three dimensional network is once broken and dispersed by the shearing force to reduce the viscosity of the system. This effect can be expected without being affected by various binder resins used in the composition.

The polyester of the present invention is preferably a polyester having a repeating unit represented by the following general formula (1-1) and a repeating unit represented by the following general formula (1-2), or a polyester having a repeating unit represented by the following general formula (1-1), a repeating unit represented by the following general formula (1-2), and a repeating unit represented by the following general formula (1-3), and having carboxyl groups at both terminals.

[Chem. 1]

(1-1)

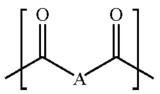

(1-2)

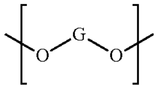

(1-3)

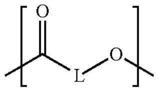

(In the formulae (1-1), (1-2), and (1-3), A is an aliphatic dibasic acid residue having 2 to 12 carbon atoms, G is an aliphatic diol residue having 2 to 9 carbon atoms, and L is a hydroxycarboxylic acid residue having 2 to 18 carbon atoms.)

The polyester of the present invention is more preferably a polyester having a repeating unit represented by the general formula (1-1) and a repeating unit represented by the general formula (1-2), and having carboxyl groups at both terminals.

The polymerization form of the polyester having the repeating unit represented by the general formula (1-1), the repeating unit represented by the general formula (1-2), and the repeating unit represented by the general formula (1-3) is not particularly limited, and may be a random copolymer of these repeating units or a block copolymer of these repeating units.

The polyester of the present invention is more preferably a polyester represented by the following general formula (1).

[Chem. 2]

(1)

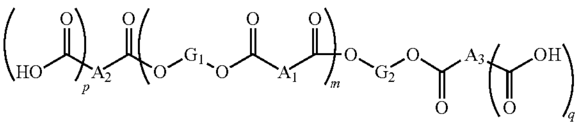

(In the general formula (1), $A_1$ is an aliphatic dibasic acid residue having 2 to 12 carbon atoms; $A_2$ and $A_3$ are each independently an aliphatic polybasic acid residue having 2 to 12 carbon atoms or an aromatic polybasic acid residue having 6 to 15 carbon atoms; $G_1$ and $G_2$ are each independently an aliphatic diol residue having 2 to 9 carbon atoms; m represents the number of repetitions and is an integer in a range of 1 to 20; p is an integer obtained by subtracting one from the number of basic acid functional groups of the aliphatic polybasic acid or the aromatic polybasic acid of $A_2$; q is an integer obtained by subtracting one from the number of basic acid functional groups of the aliphatic polybasic acid or the aromatic polybasic acid of $A_3$; and $A_1$ and $G_1$ may be the same or different for each repeating unit enclosed in parentheses.)

In the present invention, the "dibasic acid residue" is an organic group obtained by removing a basic acid functional group from a dibasic acid. For example, when the dibasic acid residue is a dicarboxylic acid residue, the dicarboxylic acid residue refers to the remaining organic group excluding the carboxyl group contained in the dicarboxylic acid. The number of carbon atoms in the dicarboxylic acid residue does not include the carbon atoms in the carboxyl group.

In the present invention, the term "polybasic acid residue" is an organic group obtained by removing a basic acid functional group from a polybasic acid having two or more basic acid functional groups. For example, in the case where the polybasic acid residue is a dicarboxylic acid residue, a tricarboxylic acid residue, or a tetracarboxylic acid residue, the dicarboxylic acid residue, the tricarboxylic acid residue, or the tetracarboxylic acid residue refers to the remaining organic group excluding the carboxyl group contained therein. The number of carbon atoms in the dicarboxylic acid residue, the tricarboxylic acid residue, and the tetracarboxylic acid residue does not include the carbon atoms in the carboxyl group.

In the present invention, the terms "diol residue" and "alcohol residue" refer to the remaining organic group excluding a hydroxy group from a diol and an alcohol.

In the present invention, the term "hydroxycarboxylic acid residue" refers to the remaining organic group excluding a hydroxy group and a carboxyl group from a hydroxycarboxylic acid. The number of carbon atoms in the hydroxycarboxylic acid residue does not include the carbon atoms in the carboxyl group.

The aliphatic dibasic acid residue having 2 to 12 carbon atoms of A and $A_1$ may include an alicyclic structure.

The aliphatic dibasic acid residue having 2 to 12 carbon atoms of A and $A_1$ is preferably an aliphatic dicarboxylic acid residue having 2 to 12 carbon atoms, and examples of the aliphatic dicarboxylic acid residue having 2 to 12 carbon atoms include a succinic acid residue, an adipic acid residue, a pimelic acid residue, a suberic acid residue, an azelaic acid residue, a sebacic acid residue, a cyclohexanedicarboxylic acid residue, a dodecanedicarboxylic acid residue, and a hexahydrophthalic acid residue.

The aliphatic dibasic acid residue having 2 to 12 carbon atoms of A and $A_1$ is preferably an aliphatic dicarboxylic acid residue having 4 to 10 carbon atoms, more preferably an aliphatic dicarboxylic acid residue having 5 to 10 carbon atoms, and still more preferably a sebacic acid residue or a dodecane dicarboxylic acid residue.

The aliphatic polybasic acid residue having 2 to 12 carbon atoms of $A_2$ and $A_3$ may include an alicyclic structure.

The aliphatic polybasic acid residue having 2 to 12 carbon atoms of $A_2$ and $A_3$ is preferably an aliphatic dicarboxylic acid residue having 2 to 12 carbon atoms, and examples of the aliphatic dicarboxylic acid residue having 2 to 12 carbon atoms include a succinic acid residue, an adipic acid residue, a pimelic acid residue, a suberic acid residue, an azelaic acid residue, a sebacic acid residue, a cyclohexanedicarboxylic acid residue, a dodecanedicarboxylic acid residue, a hexahydrophthalic acid residue, and a maleic acid residue.

The aromatic polybasic acid residue having 6 to 15 carbon atoms of $A_2$ and $A_3$ is preferably an aromatic dicarboxylic acid residue having 6 to 15 carbon atoms, an aromatic tricarboxylic acid residue having 6 to 15 carbon atoms, or an aromatic tetracarboxylic acid residue having 6 to 15 carbon atoms, and examples thereof include a phthalic acid residue, a trimellitic acid residue, and a pyromellitic acid residue.

Examples of the aliphatic diol residue having 2 to 9 carbon atoms of G, $G_1$, and $G_2$ include an ethylene glycol residue, a 1,2-propylene glycol residue, a 1,3-propanediol residue, a 1,2-butanediol residue, a 1,3-butanediol residue, a 2-methyl-1,3-propanediol residue, a 1,4-butanediol residue, a 1,5-pentanediol residue, a 2,2-dimethyl-1,3-propanediol (neopentyl glycol) residue, a 2,2-diethyl-1,3-propanediol (3,3-dimethylolpentane) residue, a 2-n-butyl-2-ethyl-1,3-propanediol (3,3-dimethylolheptane) residue, a 3-methyl-1,5-pentanediol residue, a 1,6-hexanediol residue, a 2,2,4-trimethyl-1,3-pentanediol residue, a 2-ethyl-1,3-hexanediol residue, a 2-methyl-1,8-octanediol residue, and a 1,9-nonanediol residue.

The aliphatic diol residue having 2 to 9 carbon atoms of G, $G_1$ and $G_2$ may contain an alicyclic structure and/or an ether bond.

Examples of the aliphatic diol residue having 2 to 9 carbon atoms and containing an alicyclic structure include a 1,3-cyclopentanediol residue, a 1,2-cyclohexanediol residue, a 1,3-cyclohexanediol residue, a 1,4-cyclohexanediol residue, a 1,2-cyclohexanedimethanol residue, and a 1,4-cyclohexanedimethanol residue.

Examples of the aliphatic diol residue having 2 to 9 carbon atoms and containing an ether bond include a diethylene glycol residue, a triethylene glycol residue, a tetraethylene glycol residue, a dipropylene glycol residue, and a tripropylene glycol residue.

The aliphatic diol residue having 2 to 9 carbon atoms of G, $G_1$ and $G_2$ is preferably an aliphatic diol residue having 3 to 8 carbon atoms, and more preferably a 2-methyl-1,3-propanediol residue, 3-methyl-1,5-pentanediol residue, 1,3-propylene glycol residue, a propylene glycol residue, or a diethylene glycol residue.

Examples of the hydroxycarboxylic acid residue having 2 to 18 carbon atoms of L include residues of hydroxycarboxylic acids in which the aliphatic chain of aliphatic carboxylic acids having 3 to 19 carbon atoms is substituted with one hydroxy group, such as propionic acid, butyric acid, valeric acid, caproic acid, enanthic acid capric acid, undecylic acid, lauric acid, tridecylic acid, myristic acid, pentadecylic acid, palmitic acid, margaric acid and stearic acid, and specific examples thereof include a lactic acid residue, a 9-hydroxystearic acid residue, a 12-hydroxystearic acid residue, and a 6-hydroxycaproic acid residue.

The hydroxycarboxylic acid residue having 2 to 18 carbon atoms of L is preferably an aliphatic hydroxycarboxylic acid residue having 4 to 18 carbon atoms, and more preferably a 12-hydroxystearic acid residue.

p is an integer obtained by subtracting one from the number of basic acid functional groups of the aliphatic polybasic acid or the aromatic polybasic acid of $A_2$. Similarly, q is an integer obtained by subtracting one from the number of basic acid functional groups of the aliphatic polybasic acid or the aromatic polybasic acid of $A_3$. Accordingly, when $A_2$ and $A_3$ are each independently an aliphatic dicarboxylic acid residue having 2 to 12 carbon atoms or an aromatic dicarboxylic acid residue having 6 to 15 carbon atoms, the number of basic acid functional groups (carboxyl groups) contained in $A_2$ and $A_3$ is respectively 2, and p and q are respectively 1, and the general formula (1) is represented by the following formula.

[Chem. 3]

(1)

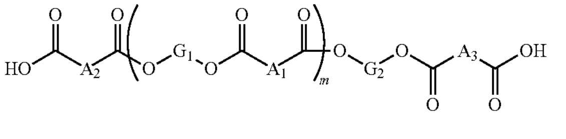

The polyester of the present invention may be used, for example, as a mixture of two or more kinds of polyesters in which at least one of each residue and the value of m in the general formula (1) is different from each other. At this time, the average value of m is preferably in a range of 2 to 15.

The average value of m can be confirmed from the number average molecular weight of the polyester.

The number average molecular weight (Mn) of the polyester of the present invention is, for example, in a range of 100 to 6,000, preferably in a range of 300 to 5,000, more preferably in a range of 500 to 5,000, and still more preferably in a range of 800 to 4,500.

The number average molecular weight (Mn) is a value in terms of polystyrene based on gel permeation chromatography (GPC) measurement, and is measured by the method described in Examples.

The acid value of the polyester of the present invention is preferably in a range of 20 to 400 mgKOH/g, more preferably in a range of 30 to 150 mgKOH/g, and still more preferably in a range of 40 to 150 mgKOH/g.

The acid value of the polyester is confirmed by the method described in Examples.

The properties of the polyester of the present invention vary depending on the number average molecular weight, composition and the like, but the polyester is usually liquid, solid, paste or the like at room temperature.

The polyester of the present invention is obtained by using reaction raw materials containing an aliphatic dibasic acid, an aliphatic polybasic acid and/or an aromatic polybasic acid, an aliphatic diol, and an optional hydroxycarboxylic acid. Here, the reaction raw material means a raw material constituting the polyester of the present invention and does not include a solvent or a catalyst which does not constitute the polyester. In addition, "optional hydroxycarboxylic acid" means that a hydroxycarboxylic acid may or may not be used.

The method for producing the polyester of the present invention is not particularly limited, and the polyester can be produced by a known method, or can be produced by a production method to be described later.

The reaction raw materials for the polyester of the present invention may contain an aliphatic dibasic acid, an aliphatic polybasic acid and/or an aromatic polybasic acid, an aliphatic diol, and an optional hydroxycarboxylic acid, and may contain other raw materials.

The reaction raw materials for the polyester of the present invention are preferably composed of an aliphatic dibasic acid, an aliphatic polybasic acid and/or an aromatic polybasic acid, an aliphatic diol and an optional hydroxycarboxylic acid in an amount of 90% by mass or more based on the total amount of the reaction raw materials, and more preferably composed of only an aliphatic dibasic acid, an aliphatic polybasic acid and/or an aromatic polybasic acid, an aliphatic diol and an optional hydroxycarboxylic acid.

The aliphatic dibasic acid used for producing the polyester of the present invention is an aliphatic dibasic acid corresponding to the aliphatic dibasic acid residue having 2 to 12 carbon atoms of A and $A_1$, and the aliphatic dibasic acid to be used may be used alone or in combination of two or more kinds thereof.

The aliphatic polybasic acid used for producing the polyester of the present invention is an aliphatic polybasic acid corresponding to the aliphatic polybasic acid residue having 2 to 12 carbon atoms of $A_2$ and $A_3$, and the aliphatic polybasic acid to be used may be used alone or in combination of two or more kinds thereof.

The aromatic polybasic acid used for producing the polyester of the present invention is an aromatic polybasic acid corresponding to the aromatic polybasic acid residue having 6 to 15 carbon atoms of $A_2$ and $A_3$, and the aromatic polybasic acid to be used may be used alone or in combination of two or more kinds thereof.

The aliphatic diol used for producing the polyester of the present invention is an aliphatic diol corresponding to the aliphatic diol residue having 2 to 9 carbon atoms of G, $G_1$, and $G_2$, and the aliphatic diol to be used may be used alone or in combination of two or more kinds thereof.

The hydroxycarboxylic acid used for producing the polyester of the present invention is a hydroxycarboxylic acid corresponding to the hydroxycarboxylic acid residue having 2 to 18 carbon atoms of L, and the hydroxycarboxylic acid to be used may be used alone or in combination of two or more kinds thereof.

The reaction raw materials to be used include derivatives such as the above-mentioned esterified compounds, the above-mentioned acid chlorides, and the above-mentioned acid anhydrides. For example, the hydroxycarboxylic acid also includes a compound having a lactone structure such as ¿-caprolactone.

The polyester of the present invention can be produced by reacting an aliphatic dibasic acid, an aliphatic polybasic acid and/or an aromatic polybasic acid, an aliphatic diol, and an optional hydroxycarboxylic acid, which constitute each residue of the polyester of the present invention, under the condition that the equivalent of the carboxyl group contained in the reaction raw material is larger than the equivalent of the hydroxy group.

The polyester of the present invention can also be produced by reacting an aliphatic dibasic acid, an aliphatic diol, and an optional hydroxycarboxylic acid constituting each residue of the polyester of the present invention under the condition that the equivalent of the hydroxy group contained in the reaction raw material is larger than the equivalent of the carboxyl group to obtain a polyester having a hydroxy group at the terminal of the main chain, and then further reacting the obtained polyester with an aliphatic polybasic acid and/or an aromatic polybasic acid.

In the production of the polyester of the present invention, the reaction of the reaction raw materials may be subjected to an esterification reaction within a temperature range of, for example, 180 to 250° C. for 10 to 25 hours in the presence of an esterification catalyst as necessary.

The conditions of the esterification reaction such as temperature and time are not particularly limited and may be appropriately set.

Examples of the esterification catalyst include titanium catalysts such as tetraisopropyl titanate and tetrabutyl titanate; zinc catalysts such as zinc acetate; tin catalysts such as dibutyltin oxide; and organic sulfonic acid catalysts such as p-toluenesulfonic acid.

The amount of the esterification catalyst to be used may be appropriately set, but is usually in a range of 0.001 to 0.1 parts by mass with respect to 100 parts by mass of the total amount of the reaction raw materials.

[Inorganic Filler-containing Resin Composition]

The dispersion stabilizer of the present invention can function as a dispersion stabilizer for an inorganic filler in a resin composition containing the inorganic filler and a resin (inorganic filler-containing resin composition), can reduce the viscosity of the composition, and can prevent the inorganic filler from aggregating and precipitating when the composition is stored for a long period of time. Among them, the dispersion stabilizer of the present invention can particularly function as a storage stabilizer for an inorganic filler-containing resin composition because it can prevent formation of an aggregate (hard cake) containing the inorganic filler.

Hereinafter, each component contained in the inorganic filler-containing resin composition of the present invention will be described.

(Inorganic Filler)

The inorganic filler contained in the inorganic filler-containing resin composition of the present invention is not particularly limited, and examples thereof include calcium carbonate, talc, silica, alumina, clay, antimony oxide, aluminum hydroxide, magnesium hydroxide, hydrotalcite, calcium silicate, magnesium oxide, potassium titanate, barium titanate, titanium oxide, calcium oxide, magnesium oxide, manganese dioxide, boron nitride, and aluminum nitride.

The inorganic filler may be used alone or in combination of two or more kinds thereof.

The inorganic filler is preferably one or more selected from the group consisting of calcium carbonate, silica, alumina, aluminum hydroxide, barium titanate, talc, boron nitride and aluminum nitride, and more preferably one or more selected from the group consisting of calcium carbonate, alumina, aluminum hydroxide and talc.

The shape of the inorganic filler, such as the particle diameter, the fiber length, and the fiber diameter, is not particularly limited and may be appropriately adjusted depending on the intended use. Also, the surface treatment state of the inorganic filler is not particularly limited, and the inorganic filler may be surface-modified with, for example, a saturated fatty acid or the like depending on the intended use.

The content of the dispersion stabilizer of the present invention is not particularly limited, but is, for example, in a range of 0.1 to 30 parts by mass of the dispersion stabilizer of the present invention with respect to 100 parts by mass of the inorganic filler, preferably in a range of 0.1 to 10 parts by mass of the dispersion stabilizer of the present invention with respect to 100 parts by mass of the inorganic filler, and more preferably in a range of 0.1 to 5.0 parts by mass of the dispersion stabilizer of the present invention with respect to 100 parts by mass of the inorganic filler.

(Viscosity Reducing Agent)

The inorganic filler-containing resin composition of the present invention preferably contains a viscosity reducing agent.

When the inorganic filler-containing resin composition contains the viscosity reducing agent, the filling amount of the inorganic filler can be increased, and handleability and the like can also be improved. The viscosity reducing agent may induce the formation of an aggregate (hard cake) containing the inorganic filler by the viscosity reduction of the composition, but the formation of the hard cake can be prevented by the dispersion stabilizer of the present invention. Therefore, in the inorganic filler-containing resin composition of the present invention, it is preferable to use the dispersion stabilizer of the present invention and the viscosity reducing agent in combination.

The viscosity reducing agent is not particularly limited, and examples thereof include anionic wetting and dispersing agents, cationic wetting and dispersing agents, and polymeric wetting and dispersing agents.

Specific examples of the viscosity reducing agent include alkyl ethers, mineral spirits, alkylbenzenes, paraffins, higher fatty acid esters, sorbitan fatty acid esters, glycerin fatty acid esters, polycarboxylates (e.g., polycarboxylate alkylammonium salts), polyester acid salts (e.g., polyester acid unsaturated polyaminoamide salts), higher fatty acid amides, polyethylene oxide derivatives, sulfuric acid esters, hydrostearic acid derivatives, polyalkylenepolyimine alkylene oxides, polyallylamine derivatives, polyether ester acid amines, polyether phosphoric acid ester amines, polyether phosphoric acid esters, polycarboxylic acid polyesters, and polyesters having a carboxyl group only at one terminal. Among them, polycarboxylic acid alkylammonium salts, higher fatty acid amides, polyester acid unsaturated polyaminoamide salts, and polyesters having a carboxyl group only at one terminal are preferable.

The viscosity reducing agent may be used alone or in combination of two or more kinds thereof.

As the viscosity reducing agent, commercially available products can be used, and examples of the commercially available products include ANTI-TERRA series such as ANTI-TERRA-U/U100, ANTI-TERRA-204, and ANTI-TERRA-250; DISPERBYK series such as DISPERBYK-106, DISPERBYK-108, and DISPERBYK-140 and BYK series such as BYK-9076 and BYK-9077 (all manufactured by BYK-Chemie); FLOWLEN series such as FLOWLEN DOPA-15B. FLOWLEN DOPA-17HF, and FLOWLEN DOPA-22 and FLOWNON series such as FLOWNON RCM-100 (all manufactured by KYOEISHA CHEMICAL Co., LTD.); SOLSPERSE series such as SOLSPERSE 3000, SOLSPERSE 20060, SOLSPERSE 40000, SOLSPERSE 42000, and SOLSPERSE 85000 (all manufactured by The Lubrizol Corporation); DISPARLON series such as DISPARLON DA-234, DISPARLON DA-325, and DISPARLON DA-375 (all manufactured by Kusumoto Chemicals, Ltd.); ESLEAM series such as ESLEAM 221P, ESLEAM C2093, ESLEAM AD-374M, and ESLEAM AD-508E, FILLANOL series such as FILLANOL PA-085C and FILLANOL PA-107P, and MALIALIM series such as MALIALIM SC-1015F, MALIALIM SC-0708A, MALIALIM AFB-1521, MALIALIM AAB-0851, and MALIALIM AWS-0851 (all manufactured by NOF Corporation); DEMOL series such as DEMOL P and DEMOL EP, POIZ series such as POIZ 520, POIZ 521, and POIZ 530, and HOMOGENOL series such as HOMOGENOL L-18 (all manufactured by Kao Corporation); and AJISPER series such as AJISPER PB821, AJISPER PB822, AJISPER PB824, AJISPER PB881, AJISPER PN411, and AJISPER PA111 (all manufactured by Ajinomoto Fine-Techno Co., Inc.).

When a polyester having a carboxyl group only at one terminal is used as the viscosity reducing agent, the polyester viscosity reducing agent is preferably a polyester represented by the following general formula (I) or the following general formula (II).

[Chem. 4]

(I)

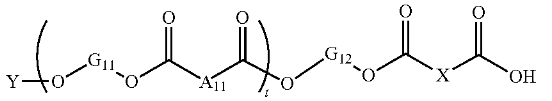

(II)

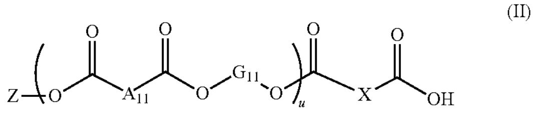

(In the general formulae (I) and (II), $A_{11}$ is an aliphatic dicarboxylic acid residue having 2 to 12 carbon atoms; $G_{11}$ and $G_{12}$ are each independently an aliphatic diol residue having 2 to 9 carbon atoms; X is a dicarboxylic acid residue having 1 to 8 carbon atoms; Y is a hydrogen atom or a monocarboxylic acid residue having 1 to 9 carbon atoms; Z is a monoalcohol residue having 2 to 10 carbon atoms; t represents the number of repetitions and is an integer in a range of 0 to 30; u represents the number of repetitions and is an integer in a range of 0 to 30; and $A_{11}$ and $G_{11}$ may be the same or different for each repeating unit enclosed in parentheses.)

The polyester represented by the general formula (I) or (II) is preferable in that the repeating unit of the polyester is common to that of the polyester of the present invention and can be produced from the same raw material.

In the general formulae (I) and (II), the aliphatic dicarboxylic residue having 2 to 12 carbon atoms of $A_{11}$ and the aliphatic diol residue having 2 to 9 carbon atoms of $G_{11}$ and $G_{12}$ are the same as those in the polyester of the present invention.

The dicarboxylic acid residue having 1 to 8 carbon atoms of X may be any of an aliphatic dicarboxylic acid residue, an alicyclic dicarboxylic acid residue, and an aromatic dicarboxylic acid residue.

Examples of the aliphatic dicarboxylic acid residue include a malonic acid residue, a succinic acid residue, a glutaric acid residue, an adipic acid residue, a pimelic acid residue, a suberic acid residue, an azelaic acid residue, a sebacic acid residue, a maleic acid residue, a fumaric acid residue, a 1,2-dicarboxycyclohexane residue, and a 1,2-dicarboxycyclohexene residue.

Examples of the aromatic dicarboxylic acid residue include a phthalic acid residue, an isophthalic acid residue, and a terephthalic acid residue.

The dicarboxylic acid residue having 1 to 8 carbon atoms of X is preferably a succinic acid residue, an adipic acid residue, a maleic acid residue, or a phthalic acid residue.

The monocarboxylic acid residue having 1 to 9 carbon atoms of Y may be any of an aliphatic monocarboxylic acid residue, an alicyclic monocarboxylic acid residue, and an aromatic monocarboxylic acid residue, and examples thereof include a propionic acid residue, a butanoic acid residue, a hexanoic acid residue, an octanoic acid residue, an octylic acid residue, a benzoic acid residue, a dimethylbenzoic acid residue, a trimethylbenzoic acid residue, a tetramethylbenzoic acid residue, an ethylbenzoic acid residue, a propylbenzoic acid residue, a butylbenzoic acid residue, a cumin acid residue, a para-tert-butylbenzoic acid residue, an orthotoluic acid residue, a metatoluic acid residue, a paratoluic acid residue, an ethoxybenzoic acid residue, a propoxybenzoic acid residue, an anisic acid residue, and a naphthoic acid residue.

Y is preferably a hydrogen atom or a benzoic acid residue.

The monoalcohol residue having 2 to 10 carbon atoms of Z may be any of an aliphatic monoalcohol residue and an alicyclic monoalcohol residue.

Examples of the monoalcohol residue having 2 to 10 carbon atoms of Z include residues such as an ethanol residue, a propanol residue, a butanol residue, a pentanol residue, a hexanol residue, a cyclohexanol residue, a heptanol residue, an octanol residue, a nonanol residue, and a decanol residue, and among these, an octanol residue, a nonanol residue and a decanol residue are preferable.

In the polyester represented by the general formula (I), Y is preferably a hydrogen atom, an acetyl group or a benzoic acid residue, $G_{11}$ and $G_{12}$ are each independently a propylene glycol residue, a neopentyl glycol residue or a 1,3- propanediol residue, $A_{11}$ is preferably an adipic acid residue, and X is preferably an adipic acid residue or a maleic acid residue.

In the polyester represented by the general formula (II), Z is preferably an octanol residue, a nonanol residue or a decanol residue, $G_{11}$ is preferably a propylene glycol residue, a neopentyl glycol residue or a 1,3-propanediol residue, An is preferably an adipic acid residue, and X is preferably an adipic acid residue or a maleic acid residue.

The polyester represented by the general formula (I) may be used, for example, as a mixture of two or more kinds of polyesters in which at least one of each residue and the value of t in the general formula (I) is different from each other. At this time, the average value of t is preferably in a range of 2 to 15. Similarly, the polyester represented by the general formula (II) may be used, for example, as a mixture of two or more kinds of polyesters in which at least one of each residue and the value of u in the general formula (II) is different from each other. At this time, the average value of u is preferably in a range of 2 to 15.

Further, a mixture of the polyester represented by the general formula (I) and the polyester represented by the general formula (II) may be used.

The average values of t and u can be confirmed from the number average molecular weight of the polyester.

The acid value of the polyester represented by the general formula (I) or (II) is preferably in a range of 3 to 50, and more preferably in a range of 3 to 35.

The acid value of the polyester is confirmed by the method described in Examples.

The number average molecular weight (Mn) of the polyester represented by the general formula (I) or (II) is preferably in a range of 300 to 3,000, more preferably in a range of 400 to 2,500, and still more preferably in a range of 400 to 1,500.

The number average molecular weight (Mn) is a value in terms of polystyrene based on gel permeation chromatography (GPC) measurement, and is measured by the method described in Examples.

The properties of the polyester represented by the general formula (I) or (II) vary depending on the number average molecular weight, composition and the like, but the polyester is usually liquid, solid, paste or the like at room temperature.

The polyester represented by the general formula (I) or (II) can be produced in the same manner as the polyester of the present invention. Specific examples thereof include a method in which the above-mentioned diol, dicarboxylic acid, monocarboxylic acid or monoalcohol are charged all at once to carry out an esterification reaction; a method in which a diol and a dicarboxylic acid are used to obtain a compound having hydroxy groups at both terminals and then a monocarboxylic acid and a dicarboxylic acid are further reacted; and a method in which a diol and a dicarboxylic acid are used to obtain a compound having carboxyl groups at both terminals and then a monoalcohol is further reacted.

Among the above, the reaction product of the aliphatic dicarboxylic acid having 2 to 12 carbon atoms and the aliphatic diol having 2 to 9 carbon atoms with the monocarboxylic acid having 1 to 9 carbon atoms or the monoalcohol having 2 to 10 carbon atoms can be a mixture of the polyester represented by the general formula (1) and the polyester represented by the general formula (I) or (II), which is the inorganic filler dispersion stabilizer of the present invention, and is preferable because both the viscosity reducing effect and the storage stabilizing effect are excellent.

The content of the viscosity reducing agent is not particularly limited, but is, for example, in a range of 0.1 to 30 parts by mass of the viscosity reducing agent with respect to 100 parts by mass of the inorganic filler, and preferably in a range of 0.1 to 10 parts by mass of the viscosity reducing agent with respect to 100 parts by mass of the inorganic filler.

(Plasticizer)

The inorganic filler-containing resin composition of the present invention preferably contains a plasticizer.

Examples of the plasticizer include benzoic acid esters such as diethylene glycol dibenzoate; phthalic acid esters such as dibutyl phthalate (DBP), di-2-ethylhexyl phthalate (DOP), diisononyl phthalate (DINP), diisodecyl phthalate (DIDP), diundecyl phthalate (DUP), and ditridecyl phthalate (DTDP); terephthalic acid esters such as bis(2-ethylhexyl) terephthalate (DOTP); isophthalic acid esters such as bis(2-ethylhexyl) isophthalate (DOIP); pyromellitic acid esters such as tetra-2-ethylhexyl pyromellitate (TOPM); aliphatic dibasic acid esters such as di-2-ethylhexyl adipate (DOA), diisononyl adipate (DINA), diisodecyl adipate (DIDA), di-2-ethylhexyl sebacate (DOS), and diisononyl sebacate (DINS); phosphoric acid esters such as tri-2-ethylhexyl phosphate (TOP) and tricresyl phosphate (TCP); alkyl esters of polyhydric alcohols such as pentaerythritol; polyesters synthesized by polyesterification of dibasic acids such as adipic acid and glycols and having a molecular weight of 800 to 4,000; epoxidized esters such as epoxidized soybean oil and epoxidized linseed oil; alicyclic dibasic acids such as diisononyl hexahydrophthalate; fatty acid glycol esters such as 1.4 butanediol dicaprate; tributyl acetylcitrate (ATBC); chlorinated paraffins obtained by chlorinating paraffin wax or n-paraffin; chlorinated fatty acid esters such as chlorinated stearic acid esters; and higher fatty acid esters such as butyl oleate.

The plasticizer to be used may be determined according to the intended use, and the above-mentioned plasticizers may be used alone or in combination of two or more kinds thereof.

The content of the plasticizer is not particularly limited, but is, for example, in a range of 10 to 300 parts by mass of the plasticizer with respect to 100 parts by mass of the inorganic filler, and preferably in a range of 30 to 200 parts by mass of the plasticizer with respect to 100 parts by mass of the inorganic filler.

The additives contained in the inorganic filler-containing resin composition of the present invention are not limited to the inorganic filler dispersion stabilizer of the present invention, the viscosity reducing agent, and the plasticizer, and other additives may be contained.

Examples of the other additives include flame retardants, stabilizers, stabilization aids, colorants, processing aids, fillers, antioxidants (aging inhibitors), ultraviolet absorbers, light stabilizers, lubricants, antistatic agents, and crosslinking aids.

(Resin)

The resin contained in the inorganic filler-containing resin composition of the present invention is not particularly limited, and examples thereof include polyolefin, polyester, polysulfide, polyvinyl chloride, modified polysulfide, silicone resin, modified silicone resin, acrylic urethane resin, epoxy resin, polyurethane, acrylic resin, polyester, and unsaturated polyester.

The resin to be used may be determined according to the intended use, and the above-mentioned resins may be used alone or in combination of two or more kinds thereof.

Although the inorganic filler-containing resin composition of the present invention contains a resin, the dispersion stabilizer of the present invention can also be suitably used in a composition containing a viscous compound such as asphalt instead of the resin.

The inorganic filler-containing resin composition of the present invention can be suitably used as a paste-like resin composition which requires fluidity in use.

Since the dispersion stabilizer of the present invention can reduce the viscosity of the composition, suppress the formation of hard cake and improve the storage stability of the composition, it is preferably applied to coating materials, adhesives, structural materials and the like which are often used outdoors, and is suitable for two component urethane-based flooring coating materials requiring mixing before coating, structural materials (building materials) for which an increase in filler content is desired, and polysulfide-based sealing materials having a particularly high filler content.

Hereinafter, a description will be given of composition examples according to applications when the inorganic filler-containing resin composition of the present invention is used as a paste-like resin composition.

(Structural Material)

Examples of the resin contained in the inorganic filler-containing resin composition used for the structural material include polyolefin, polyurethane, and unsaturated polyester.

The resin used for the structural material (building material) varies depending on the intended use, and for example, polyurethane is mainly used as the resin component in the case of a waterproof material, and unsaturated polyester is mainly used in the case of artificial marble.

When the structural material is a waterproof material, the inorganic filler-containing resin composition used for the waterproof material (hereinafter, sometimes simply referred to as "the resin composition for a waterproof material") is preferably a polyurethane composition containing, for example, a main agent component containing an isocyanate group-containing compound and a curing agent component containing one or more selected from the group consisting of an aromatic polyamine, a polyol, water, and moisture.

The isocyanate group-containing compound contained in the main agent component is preferably an isocyanate group-terminated polyurethane prepolymer obtained by reacting a polyisocyanate having a diphenylmethane diisocyanate structure with a polyol.

Examples of the polyisocyanate include 4,4'-diphenylmethane diisocyanate, 2,4'-diphenylmethane diisocyanate, and 2,2'-diphenylmethane diisocyanate. Among them, an isocyanate mixture composed of 4,4'-diphenylmethane diisocyanate and 2,4'-diphenylmethane diisocyanate and/or 2,2'-diphenylmethane diisocyanate is preferable.

As the polyol, polyoxypropylene polyol is preferable, and polyoxypolypropylene diol alone or a mixture of polyoxypropylene diol and polyoxypropylene triol is more preferable.

The ratio between the polyisocyanate and the polyol in the isocyanate group-terminated urethane prepolymer is preferably in a range of 1.8 to 2.5 in terms of the molar ratio (NCO/OH) between the isocyanate group and the hydroxy group. The isocyanate group content (NCO group content) in the isocyanate group-terminated urethane prepolymer is preferably in a range of 2 to 5% by mass.

Examples of the aromatic polyamine contained in the curing agent component include 4,4'-methylenebis(2-chloroaniline), dimethylthiotoluenediamine, and diethyltoluenediamine. Of these, 4,4'-methylenebis(2-chloroaniline) is known as "MOCA" and is widely used.

As the polyol contained in the curing agent component, polyether polyol is preferable, and polyoxypropylene polyol is particularly preferable. The number of functional groups of the polyol is preferably in a range of 2 to 4, and more preferably in a range of 2 to 3.

When the polyurethane is a two component curing type, the mixing ratio between the main agent and the curing agent is such that the molar ratio ($NCO/(NH_2+OH)$) between the isocyanate group contained in the main agent and the active hydrogen-containing group contained in the curing agent is, for example, in a range of 1.0 to 2.0, preferably in a range of 1.0 to 1.8, and more preferably in a range of 1.0 to 1.3.

The curing agent component preferably contains an inorganic filler, and examples of the inorganic filler include calcium carbonate, talc, clay, silica, and carbon.

The content of the inorganic filler in the polyurethane composition may be, for example, in a range of 10 to 60 parts by mass, preferably in a range of 20 to 50 parts by mass with respect to 100 parts by mass of the resin component. When the content of the inorganic filler is within this range, a good balance can be achieved between the curability of the composition and the performance of the resulting waterproof material.

In the case of a two component curing type polyurethane, the viscosity of both the main agent and the curing agent is usually high (main agent: for example, in a range of 7 to 10 Pa·S, curing agent: for example, in a range of 10 to 30 Pa·S), and the viscosity further increases in winter when the ambient temperature decreases. Therefore, the dispersion stabilizer of the present invention capable of improving the dispersibility of the inorganic filler and increasing the content is useful.

The dispersion stabilizer of the present invention may be contained in the resin composition for a waterproof material. For example, in the case of the two component curing type polyurethane, the dispersion stabilizer of the present invention may be contained in at least one of the main agent component and the curing agent component.

In order to accelerate the urethanization reaction, the curing agent component may contain a known curing catalyst. Examples of the curing catalyst include organic acid lead, organic acid tin, and tertiary amine compounds.

The curing agent component may contain, in addition to the inorganic filler and the curing catalyst, the viscosity reducing agent, the plasticizer, pigments such as chromium oxide, titanium oxide, and phthalocyanine; stabilizers such as an antioxidant, an ultraviolet absorber, and a dehydrating agent; and the like.

Examples of the waterproof material obtained by molding the composition for a waterproof material include a rooftop waterproof material.

The rooftop waterproof material is obtained, for example, by applying a composition obtained by mixing a main agent component and a curing agent component to a desired portion to form a coating film, followed by reaction and curing.

(Sealing Material)

The polysulfide-based resin used for the polysulfide-based sealing material is not particularly limited as long as it is a resin having a sulfide bond in the molecule, and examples thereof include a resin in which a hydrocarbon group such as an alkyl group is bonded to a sulfide bond. The polysulfide resin may have, for example, an ether bond, an ester bond, an amide bond, or an imide group in the skeleton.

When the polysulfide-based resin has an ether bond in its skeleton, it becomes a polysulfide polyether resin. The polysulfide resin may have a functional group such as a thiol group, a hydroxy group or an amino group at one terminal or both terminals.

Examples of the polysulfide-based resins include those containing a structural unit represented by $-(C_2H_4OCH_2OC_2H_4-Sx)-$ (wherein x is an integer of 1 to 5) in the main chain and having a thiol group represented by $-C_2H_4OCH_2OC_2H_4-SH$ at the terminal.

The polysulfide-based resin preferably has fluidity at room temperature, and specifically at 25° C. The number average molecular weight (Mn) of the polysulfide resin is usually 100 to 200,000, and preferably 400 to 50,000 or less.

Examples of the polysulfide-based resin also include a polysulfide polyether resin. Specific examples of the polysulfide polyether resin include a thiol group-containing polysulfide polyether resin, and include, for example, a resin containing, in the main chain, a polyether moiety represented by (1) "$-(R_1O)_n$" (wherein $R_1$ represents an alkylene group having 2 to 4 carbon atoms, and n represents an integer of 6 to 200) and a structural unit represented by (2) "$-C_2H_4OCH_2OC_2H_4-Sx-$" and (3) "$-CH_2CH(OH)CH_2-Sx-$" (wherein x is an integer of 1 to 5), and having a thiol group represented by (4) "$-C_2H_4OCH_2OC_2H_4-SH$" or "$-CH_2CH(OH)CH_2-SH$" at the terminal.

The number average molecular weight of the polysulfide polyether resin is usually 600 to 200,000, and preferably 800 to 50,000.

The method for producing the polysulfide-based resin is not limited, and those produced by various known methods can be used. Further, a commercially available product may be used as the polysulfide-based resin. Examples of the commercially available product of the polysulfide resin include "THIOKOL LP-23 and LP-32" (manufactured by Toray Fine Chemicals Co., Ltd.) and "THIOPLAST polymer" (manufactured by Akzo Nobel). The polysulfide-based resin may be used alone or in combination of two or more kinds thereof.

In the polysulfide-based sealing material containing the dispersion stabilizer of the present invention, various other additives can be used in combination. Examples of the additives include the viscosity reducing agent, the plasticizer, an adhesion promotor, a pigment, a dye, an aging inhibitor, an antioxidant, an antistatic agent, a flame retardant, a tackifier resin, a stabilizer, and a dispersant.

As the adhesion promoter, for example, a silane coupling agent such as aminosilane is particularly excellent in the effect of improving the adhesion to a glass surface, and is a general-purpose compound, and thus is suitably exemplified.

Examples of the aminosilane include 3-aminopropyltrimethoxysilane, 3-aminopropyltriethoxysilane, 3-aminopropylmethyldimethoxysilane, 3-aminopropylethyldiethoxysilane, bistrimethoxysilylpropylamine, bistriethoxysilylpropylamine, bismethoxydimethoxysilylpropylamine, bisethoxydiethoxysilylpropylamine, N-2-(aminoethyl)-3-aminopropyltrimethoxysilane, N-2-(aminoethyl)-3-aminopropylmethyldimethoxysilane, N-2-(aminoethyl)-3-aminopropyltriethoxysilane, and N-2-(aminoethyl)-3-aminopropylethyldiethoxysilane.

Examples of the pigment include organic pigments such as an azo pigment and a copper phthalocyanine pigment.

Examples of the dye include a black dye, a yellow dye, a red dye, a blue dye, and a brown dye.

Examples of the aging inhibitor include hindered phenol-based compounds and hindered amine-based compounds.

Examples of the antioxidant include butylhydroxytoluene (BHT) and butylhydroxyanisole (BHA).

Examples of the antistatic agent include quaternary ammonium salts; and hydrophilic compounds such as polyglycols and ethylene oxide derivatives.

Examples of the flame retardant include chloroalkyl phosphates, dimethyl methylphosphonate, bromine-phosphorus compounds, ammonium polyphosphate, neopentyl bromide-polyether, and brominated polyether.

Examples of the tackifier resin include terpene resins, phenol resins, terpene-phenol resins, rosin resins, xylene resins, epoxy resins, alkyl titanates, and organic polyisocyanates.

Examples of the stabilizer include fatty acid silyl esters and fatty acid amide trimethylsilyl compounds.

The dispersant is a substance for dispersing a solid in a liquid in the form of fine particles, and examples thereof include sodium hexametaphosphate, condensed sodium naphthalenesulfonate, and a surfactant.

The polysulfide-based sealing material is usually mixed with a curing agent immediately before use. As the curing agent, for example, a curing agent generally used for a polysulfide resin-based sealing material, such as a metal oxide, a metal peroxide, an organic or inorganic oxidizing agent, an epoxy compound, and an isocyanate compound, can be used. Among them, metal peroxides such as lead dioxide and manganese dioxide are preferable, and manganese dioxide is more preferable. The fluidity modifier of the present invention is preferably used by mixing with the curing agent.

When manganese dioxide is used as the curing agent, the amount of manganese dioxide used is preferably in a range of 2.5 to 25 parts by mass, and more preferably in a range of 3 to 20 parts by mass with respect to 100 parts by mass of the polysulfide resin used as the main agent, because sufficient curing is achieved and a cured product having appropriate elasticity is obtained.

The curing agent may contain other fillers, plasticizers, curing accelerators, and silane coupling agents.

When used as a sealing material, the curing condition is usually 20 to 25° C. after mixing the main agent and the curing agent. The curing time is usually in a range of 24 to 168 hours.

The inorganic filler-containing resin composition of the present invention is not limited to the above-mentioned paste-like resin composition, and can be suitably used as a resin composition for molding such as injection molding and extrusion molding. The properties of the resin composition for molding vary, and the resin composition is in a liquid state at a stage before molding (room temperature) or in a liquid state by heating at the time of molding, but the dispersion stabilizer of the present invention can reduce the viscosity of the composition and suppress the formation of a hard cake, so that an excessive increase in viscosity due to containing an inorganic filler can be suppressed, and melt kneading and the like performed before molding can be smoothly performed.

Since the dispersion stabilizer of the present invention can increase the addition amount of the inorganic filler, it can be suitably used for a resin composition for molding such as an automobile member, a sanitary absorbent article, a building material, a stone paper, and a heat dissipation member, in which it is desired to improve physical properties by increasing the addition amount of the inorganic filler.

Hereinafter, a description will be given of composition examples according to applications when the inorganic filler-containing resin composition of the present invention is used as a resin composition for molding.

(Automobile Member)

The resin component contained in the resin composition for molding used for an automobile member (hereinafter, sometimes simply referred to as "the resin composition for an automobile member") is, for example, a thermoplastic resin, and among the thermoplastic resins, a polypropylene resin having characteristics such as excellent moldability, high mechanical strength, and economical efficiency is preferable.

The above polypropylene resins are not particularly limited, but polypropylene resins having an MFR (230° C., 2.16 kg) of 60 to 120 g/10-min are preferred.

The resin composition for an automobile member may further contain an olefin-based thermoplastic elastomer as a resin component. The olefin-based thermoplastic elastomer is not particularly limited, but preferably contains an ethylene-α-olefin copolymer.

Examples of the inorganic filler contained in the resin composition for an automobile member include talc, calcium carbonate, whiskers (examples of materials of the whiskers include graphite, potassium titanate, alumina, silicon carbide, silicon nitride, mullite, magnesia, magnesium borate, aluminum borate, magnesium sulfate, zinc oxide, and titanium boride), carbon nanofibers, carbon nanotubes, kaolin clay, and mica.

The resin composition for an automobile member may contain various additives other than the dispersion stabilizer of the present invention and the inorganic filler, and examples of the additives include the viscosity reducing agent, the plasticizer, an antioxidant, an ultraviolet absorber, a light stabilizer, a flame retardant, and a colorant.

The composition ratio of the resin component, the inorganic filler, the dispersion stabilizer, and the like contained in the resin composition for an automobile member is not particularly limited, but is preferably adjusted to a composition satisfying one or more of the following physical properties.

The MFR (230° C., 2.16 kg, JIS-K7210-1) of the resin composition for an automobile member is preferably 20 g/10-min or more, and more preferably in a range of 20 to 30 g/10-min.

The linear expansion coefficient (JIS-K7197) of the resin composition for an automobile member is preferably $5.0\times10^{-5}$/K or less, and more preferably 4.0 to $5.0\times10^{-5}$/K.

The tensile elastic modulus (JIS-K7161) of the resin composition for an automobile member is preferably 2.5 GPa or more, and more preferably in a range of 2.5 to 3.0 GPa.

The Charpy impact value (JIS-K7111) of the resin composition for an automobile member is preferably 30 $KJ/m^2$ or more, and more preferably in a range of 30 to 40 $KJ/m^2$.

Examples of the automobile member obtained by molding the resin composition for an automobile member include a bonnet hood, a fender, a bumper, a door, a trunk lid, a roof, a radiator grille, a wheel cap, an instrument panel, and a pillar garnish.

These automobile members can be produced by injection molding the resin composition for an automobile member.

(Sanitary Absorbent Article)

The resin component contained in the resin composition for molding used in sanitary absorbent articles (hereinafter, sometimes simply referred to as "the resin composition for sanitary absorbent articles") is, for example, a polyolefin, and among the polyolefins, one or more selected from the group consisting of polyethylene and polypropylene is preferable, and polyethylene is more preferable.

When polyethylene is used as the resin component, for example, two or more types of polyethylene having different densities may be used.

The polyolefin which is a resin component of the resin composition for sanitary absorbent articles is not particularly limited, but the MFR (190° C., 2.16 kgf) is preferably in a range of 0.1 to 20 g/10-min, and more preferably in a range of 0.5 to 5 g/10-min.

When the MFR is 0.1 g/10-min or more, the moldability of the thin film can be sufficiently maintained, and when the MFR is 20 g/10-min or less, the thin film can have sufficient strength.

The resin composition for sanitary absorbent articles may further contain a polystyrene elastomer as a resin component.

Examples of the polystyrene elastomer include styrene block-containing elastomers such as styrene-olefin elastomers (e.g., SEP and SEBC), styrene-olefin-styrene elastomers (e.g., SEPS and SEBS), styrene-diene elastomers (e.g., SIS and SBS), and hydrogenated styrene-diene elastomers (e.g., HSIS and HSBR).

The styrene component in these polystyrene elastomers is preferably in a range of 10 to 40% by mass, and more preferably in a range of 20 to 40% by mass.

Examples of the inorganic filler contained in the resin composition for sanitary absorbent articles include calcium carbonate, calcium sulfate, barium carbonate, and titanium oxide, and one or more kinds selected from the group consisting of calcium carbonate and barium sulfate are preferable.

The shape of the inorganic filler is not particularly limited, but is preferably particulate, more preferably fine particles having an average particle diameter in a range of 0.1 to 10 μm, still more preferably fine particles having an average particle diameter in a range of 0.3 to 5 μm, and particularly preferably fine particles having an average particle diameter in a range of 0.5 to 3 μm.

The content of the inorganic filler in the resin composition for sanitary absorbent articles is, for example, preferably polyolefin:inorganic filler=60 to 20 parts by mass:40 to 80 parts by mass, more preferably polyolefin:inorganic filler=55 to 25 parts by mass:45 to 75 parts by mass, and still more preferably polyolefin:inorganic filler=50 to 30 parts by mass:50 to 70 parts by mass.

When the content of the inorganic filler is within the above range, all of moisture permeability, air permeability, and liquid permeability resistance of the sanitary absorbent article to be obtained can be sufficiently ensured.

The resin composition for sanitary absorbent articles may contain various additives other than the dispersion stabilizer of the present invention and the inorganic filler, and examples of the additives include the viscosity reducing agent, the plasticizer, a compatibilizer, a processing aid, an antioxidant, a heat stabilizer, a light stabilizer, an ultraviolet absorber, an antiblocking agent, an antifogging agent, a matting agent, a surfactant, an antibacterial agent, a deodorant, an antistatic agent, a water repellent agent, an oil repellent agent, a radiation shielding agent, a colorant, and a pigment.

A molded article obtained by molding the resin composition for sanitary absorbent articles can be suitably used as a back sheet (a sheet which has air permeability and moisture permeability but does not allow liquid to pass therethrough) used in sanitary absorbent articles such as disposable diapers and sanitary napkins.

The back sheet can be produced, for example, by melt-kneading the resin composition for sanitary absorbent articles, forming a sheet by a T-die method or an inflation method, and then uniaxially or biaxially stretching the obtained sheet.

(Stone Paper)

The stone paper is a sheet containing calcium carbonate derived from limestone and polyolefin (polyethylene, polypropylene, etc.), does not require water and wood for forming the sheet, and is a sheet excellent in sustainability because limestone as a raw material is almost inexhaustibly present on the earth.

Although the stone paper contains a large amount of calcium carbonate, the fluidity of calcium carbonate can be enhanced by the dispersion stabilizer of the present invention, so that the physical properties of the sheet can be enhanced.

The stone paper can be produced, for example, by melt-kneading a stone paper composition containing calcium carbonate, polyolefin, and the dispersion stabilizer of the present invention and subjecting the kneaded mixture to inflation molding or extrusion molding.

In the stone paper composition, the content of calcium carbonate is, for example, 85:15 to 20:80, preferably 85:15 to 30:70, more preferably 85:15 to 35:65, and still more preferably 80:20 to 40:60 in terms of a mass ratio between polyolefin and calcium carbonate (polyolefin:calcium carbonate).

The stone paper composition may further contain the viscosity reducing agent, the plasticizer, a foaming agent, a coloring agent, a lubricant, a coupling agent, a stabilizer (an antioxidant, an ultraviolet absorber, or the like), or an antistatic agent as an auxiliary agent.

Examples of the foaming agent include aliphatic hydrocarbon compounds such as propane, n-butane, isobutane, n-pentane, isopentane, and hexane; alicyclic hydrocarbon compounds such as cyclohexane, cyclopentane, and cyclobutane; and halogenated hydrocarbon compounds such as trifluoromonochloroethane and difluorodichloromethane.

Examples of the lubricant include fatty acid-based lubricants such as stearic acid, hydroxystearic acid, complex stearic acid, and oleic acid; aliphatic alcohol-based lubricants; aliphatic amide-based lubricants such as stearamide, oxystearamide, oleylamide, erucylamide, ricinoleamide, behenamide, methylolamide, methylenebisstearamide, methylenebisstearobehenamide, bisamide acid of higher fatty acid, and complex amide; aliphatic ester-based lubricants such as n-butyl stearate, methyl hydroxystearate, polyhydric alcohol fatty acid ester, saturated fatty acid ester, and ester wax; and fatty acid metal soap-based lubricants.

Examples of the antioxidant include phosphorus-based antioxidants, phenol-based antioxidants, and pentaerythritol-based antioxidants.

Examples of the phosphorus-based antioxidant include phosphorous acid esters such as triesters, diesters, and monoesters of phosphorous acid such as triphenyl phosphite, trisnonylphenyl phosphite, and tris(2,4-di-tert-butylphenyl) phosphite; and phosphoric acid esters such as trimethyl phosphate, triethyl phosphate, tributyl phosphate, trioctyl phosphate, triphenyl phosphate, tricresyl phosphate, tris (nonylphenyl) phosphate, and 2-ethylphenyl diphenyl phosphate.

Examples of the phenol-based antioxidant include α-tocopherol, butylhydroxytoluene, sinapyl alcohol, vitamin E, n-octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N, N-dimethylaminomethyl) phenol, 3,5-di-tert-butyl-4-hydroxybenzylphosphonate diethyl ester, and tetrakis [3-(3, 5-di-tert-butyl-4-hydroxyphenyl) propionyloxymethyl] methane.

(Heat Dissipation Member)

In electronic devices such as a personal computer, a smartphone, and a television, the amount of heat generated has increased with higher performance. In order to efficiently dissipate the generated heat, heat dissipation members containing thermally conductive fillers are often used. In addition, vehicles such as electric vehicles and hybrid vehicles also include many electronic devices, and heat dissipation members containing thermally conductive fillers are often used.

Examples of the resin component contained in the resin composition for molding used for a heat dissipation member (hereinafter, sometimes simply referred to as "the resin composition for a heat dissipation member") include a thermosetting resin, an active energy ray-curable resin, and a thermoplastic resin.

As the thermosetting resin of the resin composition for a heat dissipation member, a known thermosetting resin can be used, and examples thereof include novolac phenol resins such as phenol novolac resins and cresol novolac resins; phenol resins such as resol type phenol resins such as unmodified resol phenol resins and oil-modified resol phenol resins modified with tung oil, linseed oil, walnut oil, and the like; bisphenol type epoxy resins such as bisphenol A epoxy resins and bisphenol F epoxy resins; novolac type epoxy resins such as fatty chain-modified bisphenol type epoxy resins, novolac epoxy resins, and cresol novolac epoxy resins; epoxy resins such as biphenyl type epoxy resins and polyalkylene glycol type epoxy resins; resins having a triazine ring such as urea resins and melamine resins; vinyl resins such as (meth)acrylic resins and vinyl ester resins; unsaturated polyester resins, bismaleimide resins, polyurethane resins, diallyl phthalate resins, silicone resins, resins having a benzoxazine ring, and cyanate ester resins.

The thermosetting resin may be used together with a curing agent.

Examples of the curing agent used together with the thermosetting resin include amine-based compounds such as diaminodiphenylmethane, diethylenetriamine, triethylenetetramine, diaminodiphenylsulfone, isophoronediamine, imidazole, BF3-amine complex, and guanidine derivatives; amide-based compounds such as dicyandiamide and polyamide resins synthesized from a dimer of linolenic acid and ethylene diamine; acid anhydride compounds such as phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride; and phenol-based compounds such as phenol novolac resin, cresol novolac resin, aromatic hydrocarbon formaldehyde resin-modified phenol resin, dicyclopentadiene phenol addition type resin, phenol aralkyl resin (Zylock resin), resorcin novolac resin, naphthol aralkyl resin, trimethylolmethane resin, tetraphenylolethane resin, naphthol novolac resin, naphthol-phenol cocondensed novolac resin, naphthol-cresol cocondensed novolac resin, biphenyl-modified phenol resin, biphenyl-modified naphthol resin, aminotriazine-modified phenol resin, and alkoxy group-containing aromatic ring-modified novolac resin.

As the thermoplastic resin of the resin composition for a heat dissipation member, a known thermoplastic resin can be used, and examples thereof include polyethylene resin, polypropylene resin, polymethyl methacrylate resin, polyvinyl acetate resin, ethylene-propylene copolymer, ethylene-vinyl acetate copolymer, polyvinyl chloride resin, polystyrene resin, polyacrylonitrile resin, polyamide resin, polycarbonate resin, polyacetal resin, polyethylene terephthalate resin, polyphenylene oxide resin, polyphenylene sulfide resin, polysulfone resin, polyethersulfone resin, polyetheretherketone resin, polyallylsulfone resin, thermoplastic polyimide resin, thermoplastic urethane resin, polyaminobismaleimide resin, polyamideimide resin, polyetherimide resin, bismaleimidetriazine resin, polymethylpentene resin, fluorinated resin, liquid crystal polymer, olefin-vinyl alcohol copolymer, ionomer resin, polyarylate resin, acrylonitrile-ethylene-styrene copolymer, acrylonitrile-butadiene-styrene copolymer, and acrylonitrile-styrene copolymer.

Examples of the thermally conductive filler contained in the resin composition for a heat dissipation member include alumina, aluminum hydroxide, magnesium hydroxide, calcium carbonate, magnesium carbonate, calcium silicate, calcium oxide, magnesium oxide, zinc oxide, beryllia, aluminum oxide, aluminum nitride, boron nitride, hydrated metal compounds, fused silica, crystalline silica, non-crystalline silica, silicon carbide, silicon nitride, titanium carbide, and diamond.

The thermally conductive filler may be surface-treated with a silane-based, titanate-based, or aluminate-based coupling agent.

The shape of the thermally conductive filler is not particularly limited, and may be any of a spherical shape, an acicular shape, a flake shape, a dendritic shape, and a fibrous shape.

The content of the thermally conductive filler in the resin composition for a heat dissipation member can be appropriately adjusted depending on the intended use. The content of the thermally conductive filler is preferably in a range of 30 to 500 parts by mass with respect to 100 parts by mass of the resin component.

The resin composition for a heat dissipation member may contain various additives other than the inorganic filler dispersion stabilizer of the present invention and the thermally conductive filler. Examples of the additives include a dye, a pigment, an antioxidant, a polymerization inhibitor, an antifoaming agent, a leveling agent, an ion scavenger, a humectant, a viscosity modifier, a preservative, an antibacterial agent, an antistatic agent, an antiblocking agent, an ultraviolet absorber, and an infrared absorber.

When the resin composition for a heat dissipation member contains a thermosetting resin, the heat dissipation member can be molded by heating the resin composition for a heat dissipation member. When the resin composition for a heat dissipation member contains an active energy ray-curable resin, the resin composition can be cured and molded by irradiation with an active energy ray such as an ultraviolet ray or an infrared ray. When the resin composition for a heat dissipation member contains a thermoplastic resin, the heat dissipation member can be obtained by a known molding method such as injection molding, extrusion molding, or press molding.

The heat dissipation member obtained by molding the resin composition for a heat dissipation member can be used as a heat sink. The heat dissipation member obtained by molding the resin composition for a heat dissipation member can also be used as a heat dissipation bonding member for bonding a portion where heat dissipation is desired and a metal heat dissipation member.

The resin composition for a heat dissipation member can also be used as a semiconductor sealing material.

Although the inorganic filler-containing resin composition has been described above, the inorganic filler dispersion stabilizer of the present invention can improve the storage stability even in an inorganic filler-containing composition containing no resin.

For example, by adding the dispersion stabilizer of the present invention to a composition containing an organic solvent such as acetone and an inorganic filler, the sedimentation rate of the inorganic filler can be lowered and the formation of an aggregate (hard cake) containing the inorganic filler can be suppressed.

EXAMPLES

Hereinafter, the present invention will be specifically described with reference to Examples and Comparative Examples.

However, the present invention is not limited to the following examples.

In the examples of the present application, values of the acid value and the hydroxyl value are values evaluated by the following methods.

[Method for Measuring Acid Value]

The acid value was measured by a method in accordance with JIS K0070-1992.

[Method for Measuring Hydroxyl Value]

The hydroxyl value was measured by a method in accordance with JIS K0070-1992.

In the examples of the present application, the number average molecular weight of the polyester is a value in terms of polystyrene based on GPC measurement, and the measurement conditions are as follows.

[GPC Measurement Conditions]

Measurement apparatus: high-speed GPC apparatus "HLC-8320GPC" manufactured by Tosoh Corporation Column: "TSK GURDCOLUMN SuperHZ-L" manufactured by Tosoh Corporation+"TSK gel SuperHZM-M" manufactured by Tosoh Corporation+"TSK gel SuperHZM-M" manufactured by Tosoh Corporation+"TSK gel SuperHZ-2000" manufactured by Tosoh Corporation+"TSK gel SuperHZ-2000" manufactured by Tosoh Corporation Detector: RI (differential refractometer)

Data processing: "EcoSEC Data Analysis Version 1.07" manufactured by Tosoh Corporation Column temperature: 40° C.

Developing solvent: tetrahydrofuran

Flow rate: 0.35 mL/min

Measurement sample: 7.5 mg of a sample was dissolved in 10 mL of tetrahydrofuran, and the obtained solution was filtered through a microfilter to obtain a measurement sample.

Sample injection amount: 20 μL

Standard sample: The following monodispersed polystyrenes having known molecular weights were used in accordance with the measurement manual of "HLC-8320GPC".

(Monodispersed Polystyrene)

"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation "F-20" manufactured by Tosoh Corporation "F-40" manufactured by Tosoh Corporation "F-80" manufactured by Tosoh Corporation "F-128" manufactured by Tosoh Corporation "F-288" manufactured by Tosoh Corporation Example 1: Synthesis of Dispersion Stabilizer A 531.8 g of 3-methyl-1,5-pentanediol, 1235.1 g of sebacic acid, and 0.0053 g of tetraisopropyl titanate as an esterification catalyst were charged into a four-necked flask having an inner volume of 3 liters equipped with a thermometer, a stirrer, and a reflux condenser, and the mixture was subjected to a condensation reaction for a total of 10 hours by gradually increasing the temperature to 220° C. while stirring under a nitrogen gas stream. After completion of the reaction, unreacted components were distilled off under reduced pressure to obtain a dispersion stabilizer A (acid value: 110, hydroxyl value: 0, number average molecular weight: 1,000) containing a polyester having carboxyl groups at both terminals.

Example 2: Synthesis of Dispersion Stabilizer B 1702.5 g of 3-methyl-1,5-pentanediol, 625.5 g of 1,1,2-dodecanedioic acid, and 0.069 g of tetraisopropyl titanate as an esterification catalyst were charged into a four-necked flask having an inner volume of 3 liters equipped with a thermometer, a stirrer, and a reflux condenser, and the mixture was subjected to a condensation reaction for a total of 10 hours by gradually increasing the temperature to 220° C. while stirring under a nitrogen gas stream. After completion of the reaction, unreacted components were distilled off under reduced pressure to obtain a dispersion stabilizer B (acid value: 108.5, hydroxyl value: 0.01, number average molecular weight: 1,000) containing a polyester having carboxyl groups at both terminals.

Example 3: Synthesis of Dispersion Stabilizer C 1214 g of 3-methyl-1,5-pentanediol, 966 g of sebacic acid, and 0.07 g of tetraisopropyl titanate as an esterification catalyst were charged into a four-necked flask having an inner volume of 2 liters equipped with a thermometer, a stirrer, and a reflux condenser, and the mixture was subjected to a condensation reaction for a total of 12 hours by gradually increasing the temperature to 220° C. while stirring under a nitrogen gas stream. After the reaction, 0.11 g of hydroquinone and 203 g of maleic anhydride were charged at 150° C., and the reaction was completed, thereby obtaining a dispersion stabilizer C (acid value: 24.7, hydroxyl value: 64, number average molecular weight: 1,700) containing a polyester having carboxyl groups at both terminals.

It was confirmed by MALDI-TOF/MS measurement that the dispersion stabilizer C contained the polyester in which both terminals are carboxyl groups. Specifically, the dispersion stabilizer C was evaluated using a matrix-assisted laser desorption ionization time-of-flight mass spectrometer (AXIMA TOF2 manufactured by Shimadzu Corporation), and molecular weights of 621 $(M+Na)^+$ and 905 $(M+Na)^+$, which are observed when both terminals become carboxyl groups, were detected in a polyester using sebacic acid, 3-methyl-1,5-pentanediol, and maleic acid as reaction raw materials.

The measurement results are shown in FIG. 1.

Example 4: Synthesis of Dispersion Stabilizer D 395.7 g of propylene glycol, 809.0 g of sebacic acid, and 0.07 g of tetraisopropyl titanate as an esterification catalyst were charged into a four-necked flask having an inner volume of 2 liters equipped with a thermometer, a stirrer, and a reflux condenser, and the mixture was subjected to a condensation reaction for a total of 12 hours by gradually increasing the temperature to 220° C. while stirring under a nitrogen gas stream. After the reaction, 0.06 g of hydroquinone and 109.8 g of maleic anhydride were charged at 150° C., and the reaction was completed, thereby obtaining a dispersion stabilizer D (acid value: 44.8, hydroxyl value: 38.0, number average molecular weight: 1,840) containing a polyester having carboxyl groups at both terminals.

Example 5: Synthesis of Dispersion Stabilizer E 1214 g of 3-methyl-1,5-pentanediol, 966 g of sebacic acid, and 0.07 g of tetraisopropyl titanate as an esterification catalyst were charged into a four-necked flask having an inner volume of 2 liters equipped with a thermometer, a stirrer, and a reflux condenser, and the mixture was subjected to a condensation reaction for a total of 12 hours by gradually increasing the temperature to 220° C. while stirring under a nitrogen gas stream. After the reaction, 306.7 g of phthalic anhydride was charged at 150° C., and the reaction was completed, thereby obtaining a dispersion stabilizer E (acid value: 49.0, hydroxyl value: 48.4, number average molecular weight: 1,170) containing a polyester having carboxyl groups at both terminals.

Example 6: Synthesis of Dispersion Stabilizer F 459.3 g of 1,3-butanediol, 48.7 g of neopentyl glycol, 616.2 g of adipic acid, and 0.112 g of tetraisopropyl titanate as an esterification catalyst were charged into a four-necked flask having an inner volume of 2 liters equipped with a thermometer, a stirrer, and a reflux condenser, and the mixture was subjected to a condensation reaction for a total of 10 hours by gradually increasing the temperature to 220° C. while stirring under a nitrogen gas stream. After the reaction, 0.056 g of hydroquinone and 44.2 g of maleic anhydride were charged at 150° C., and the reaction was completed, thereby obtaining a dispersion stabilizer F (acid value: 29.1, hydroxyl value: 121, number average molecular weight: 900) containing a polyester having carboxyl groups at both terminals.

Synthesis Example 1: Synthesis of Viscosity Reducing Agent A 1680 g of 12-hydroxystearic acid and 0.252 g of tetraisopropyl titanate as an esterification catalyst were charged into a four-necked flask having an inner volume of 3 liters equipped with a thermometer, a stirrer, and a reflux condenser, and the mixture was subjected to a condensation reaction for a total of 15 hours by gradually increasing the temperature to 210° C. while stirring under a nitrogen gas stream. After completion of the reaction, unreacted components were distilled off under reduced pressure to obtain a viscosity reducing agent A (acid value: 29.7, hydroxyl value: 19.1, number average molecular weight: 1,800) which was a polyester having a carboxyl group at one terminal and a hydroxy group at the other terminal.

Examples 7 to 15 and Comparative Examples 1 to 5: Preparation and Evaluation of Calcium Carbonate-Containing Composition Calcium carbonate (heavy calcium carbonate, "SUPER S" manufactured by Maruo Calcium Co., Ltd.) as an inorganic filler, DINP (diisononyl phthalate) as a plasticizer, DETDA (diethyltoluenediamine) as an active hydrogen compound, a dispersion stabilizer, and a viscosity reducing agent were blended at the proportions shown in Tables 1 and 2, and were stirred by a planetary stirring device (THINKY ARV-310) at 1000 rpm and 0.2 Pa for 2 minutes, thereby obtaining a paste-like inorganic filler-containing composition.

The obtained paste composition was evaluated for viscosity and storage stability by the following methods. Results are shown in Tables 1 and 2.

[Measurement Method of Viscosity]

The viscosity of the obtained paste was measured by an E-type viscometer (TV-25H manufactured by Toyo Sangyo Co., Ltd.) using a standard rotor (1° 34'×R24, shear rate [1/S] 3.83×N, N is the rotation speed [rpm] of the rotor). To be specific, the obtained paste was treated at a measurement temperature of 25° C. and a rotation speed of 10 rpm, and the viscosity value of the composition after treatment for 3 minutes was read.

[Evaluation of Storage Stability]

The obtained composition 12 g was stored in a 50 cc glass bottle and allowed to stand in a thermostat at 50° C. for 2 weeks.

The composition after standing was visually and tactually checked and evaluated according to the following criteria.

A: The presence of aggregates (hard cake) of the inorganic filler cannot be observed.

NG: The presence of aggregates (hard cake) of the inorganic filler can be observed.

TABLE 1

| | | | Example 7 | Example 8 | Example 9 | Example 10 | Example 11 | Example 12 | Example 13 | Example 14 | Example 15 |
|---|---|---|---|---|---|---|---|---|---|---|---|
| Blending proportion [g] | Calcium carbonate | | 60 | 60 | 60 | 60 | 60 | 60 | 60 | 60 | 60 |
| | DINP | | 33 | 33 | 33 | 33 | 33 | 33 | 33 | 33 | 33 |
| | DETDA | | 7 | 7 | 7 | 7 | 7 | 7 | 7 | 7 | 7 |
| | Viscosity reducing agent | n-hexyl ether | | | | | | | | | |
| | | Mineral spirit | | | | | | | | | |
| | | Viscosity reducing agent A | 0.3 | 0.22 | 0.3 | 0.22 | | | | | |
| | Dispersion stabilizer A | | 0.1 | 0.08 | | | | | | | |
| | Dispersion stabilizer B | | | | 0.1 | 0.08 | | | | | |
| | Dispersion stabilizer C | | | | | | 0.3 | | | | |
| | Dispersion stabilizer D | | | | | | | 0.3 | 1.0 | | |
| | Dispersion stabilizer E | | | | | | | | | 0.3 | |
| | Dispersion stabilizer F | | | | | | | | | | 1.0 |
| Viscosity [mPa · s] | | | 1,200 | 1,100 | 1,200 | 1,100 | 1,000 | 1,270 | 1,400 | 1,810 | 1,950 |
| Storage stability | | | A | A | A | A | A | A | A | A | A |

TABLE 2

| | | | Comparative Example 1 | Comparative Example 2 | Comparative Example 3 | Comparative Example 4 | Comparative Example 5 |
|---|---|---|---|---|---|---|---|
| Blending proportion [g] | Calcium carbonate | | 60 | 60 | 60 | 60 | 60 |
| | DINP | | 33 | 33 | 33 | 33 | 33 |
| | DETDA | | 7 | 7 | 7 | 7 | 7 |
| | Viscosity reducing agent | n-hexyl ether | | 0.3 | | | |
| | | Mineral spirit | | | 0.3 | | |
| | | Viscosity reducing agent A | | | | 0.3 | 1.0 |
| | Dispersion stabilizer A | | | | | | |
| | Dispersion stabilizer B | | | | | | |
| | Dispersion stabilizer C | | | | | | |
| | Dispersion stabilizer D | | | | | | |
| | Dispersion stabilizer E | | | | | | |
| | Dispersion stabilizer F | | | | | | |
| Viscosity [mPa · s] | | | >5,120 | >5,120 | >5,120 | 900 | 1080 |
| Storage stability | | | A | A | A | NG | NG |

From the evaluation results of Examples 7 to 10 and Comparative Examples 4 and 5, it can be seen that in the paste using both the inorganic filler dispersion stabilizer of the present invention and the viscosity reducing agent, the viscosity is slightly increased but the storage stability is remarkably improved. In addition, it can be seen from the evaluation results of Examples 11 to 15 and Comparative Examples 1 to 3 that the inorganic filler dispersion stabilizer of the present invention can sufficiently exhibit not only the storage stabilizing effect but also the viscosity reducing effect.

Examples 16 to 18 and Comparative Examples 6 to 8: Preparation and Evaluation of Calcium Carbonate-Containing Resin Composition Calcium carbonate (heavy calcium carbonate, "SUPER S" manufactured by Maruo Calcium Co., Ltd.) as an inorganic filler, polyethylene ("UMERIT 2040F" manufactured by Ube Industries, Ltd.) as a binder resin, a dispersion stabilizer, and a viscosity reducing agent were blended at the proportions shown in Table 3, and the mixture was charged into a batch type kneading machine ("Labo Plastomill 4C150" manufactured by Toyo Seiki Seisaku-sho, Ltd.) and melt-kneaded at a set temperature of 170° C., a blade rotation speed of 50 r/min, and a kneading time of 10 minutes to prepare an inorganic filler-containing resin composition.

The torque value and internal temperature of melt-kneading during the preparation of the inorganic filler-containing resin composition were evaluated. Results are shown in Table 3. The torque value and the internal temperature are values obtained by reading the display values of the kneading machine at a kneading time of 8 minutes.

TABLE 3

| | | | Example 16 | Example 17 | Example 18 | Comparative Example 6 | Comparative Example 7 | Comparative Example 8 |
|---|---|---|---|---|---|---|---|---|
| Blending proportion [g] | Calcium carbonate | | 10.8 | 10.8 | 10.8 | 10.8 | 10.8 | 10.8 |
| | Polyethylene | | 36 | 36 | 36 | 36 | 36 | 36 |
| | Viscosity reducing agent | Calcium stearate | | | | 0.72 | | |
| | | Hardened castor oil | | | | | 0.72 | |
| | | Viscosity reducing agent A | | | | | | 0.72 |
| | Dispersion stabilizer A | | 0.72 | | | | | |
| | Dispersion stabilizer C | | | 0.72 | | | | |
| | Dispersion stabilizer D | | | | 0.72 | | | |
| Torque value [N · m] | | | 10 | 11 | 9 | 15 | 14 | 14 |
| Internal temperature [° C.] | | | 173 | 174 | 172 | 177 | 175 | 177 |

From the evaluation results of Examples 16 to 18 and Comparative Examples 6 to 8, it can be seen that in the resin composition containing the inorganic filler dispersion stabilizer of the present invention, the torque value is reduced and the temperature rise is suppressed, and thus the viscosity of the resin composition is reduced by the inorganic filler dispersion stabilizer of the present invention.

Example 19 and Comparative Examples 9 and 10: Preparation and Evaluation of Talc-Containing Resin Composition 10.8 g of talc ("RL217" manufactured by Fuji Talc Industrial Co., Ltd.) as an inorganic filler, 36 g of polypropylene (a homopolymer of polypropylene; "J106G" manufactured by Prime Polymer Co., Ltd.) as a binder resin, a dispersion stabilizer, and a viscosity reducing agent were blended at the proportions shown in Table 4, and the mixture was charged into a batch type kneading machine ("Labo Plastomill 4C150" manufactured by Toyo Seiki Seisaku-sho, Ltd.) and melt-kneaded at a set temperature of 170° C., a blade rotation speed of 50 r/min, and a kneading time of 10 minutes to prepare a resin composition.

The torque value and the internal temperature during melt-kneading were evaluated. Results are shown in Table 4.

The torque value and the internal temperature are values obtained by reading the display values of the kneading machine after 8 minutes of kneading.

TABLE 4

| | | Example 19 | Comparative Example 9 | Comparative Example 10 |
|---|---|---|---|---|
| Blending proportion [g] | Talc | 10.8 | 10.8 | 10.8 |
| | Polypropylene | 36 | 36 | 36 |
| | Viscosity reducing agent A | | | 0.72 |
| | Dispersion stabilizer A | 0.72 | | |
| Torque value [N · m] | | 7.0 | 8.0 | 7.7 |
| Internal temperature [° C.] | | 173 | 174 | 174 |

From the evaluation results of Example 19 and Comparative Examples 9 and 10, it can be seen that in the resin composition containing the inorganic filler dispersion stabilizer of the present invention, the torque value is reduced and the temperature rise is suppressed, and thus the viscosity of the resin composition is reduced by the inorganic filler dispersion stabilizer of the present invention.

Example 20: Synthesis of Dispersion Stabilizer G 1,634 g of 1,3-butanediol, 210 g of neopentyl glycol, 2,338 g of adipic acid, and 0.125 g of tetraisopropyl titanate as an esterification catalyst were charged into a four-necked flask having an inner volume of 5 liters equipped with a thermometer, a stirrer, and a reflux condenser, and the mixture was subjected to a condensation reaction for a total of 16 hours by gradually increasing the temperature to 220° C. while stirring under a nitrogen gas stream. After the reaction, 373 g of maleic anhydride was charged at 125° C., and the reaction was completed, thereby obtaining a dispersion stabilizer G (acid value: 55, hydroxyl value: 53, number average molecular weight: 1190) containing a polyester having carboxyl groups at both terminals.

Example 21: Synthesis of Dispersion Stabilizer H 1,394 g of 1,3-butanediol, 179 g of neopentyl glycol, 2,629 g of sebacic acid, and 0.126 g of tetraisopropyl titanate as an esterification catalyst were charged into a four-necked flask having an inner volume of 5 liters equipped with a thermometer, a stirrer, and a reflux condenser, and the mixture was subjected to a condensation reaction for a total of 17 hours by gradually increasing the temperature to 220° C. while stirring under a nitrogen gas stream. After the reaction, 387 g of maleic anhydride was charged at 125° C., and the reaction was completed, thereby obtaining a dispersion stabilizer H (acid value: 56, hydroxyl value: 43, number average molecular weight: 1550) containing a polyester having carboxyl groups at both terminals.

Example 22: Synthesis of Dispersion Stabilizer I 1,214 g of 3-methyl-1,5-pentanediol, 966 g of sebacic acid, and 0.07 g of tetraisopropyl titanate as an esterification catalyst were charged into a four-necked flask having an inner volume of 3 liters equipped with a thermometer, a stirrer, and a reflux condenser, and the mixture was subjected to a condensation reaction for a total of 12 hours by gradually increasing the temperature to 220° C. while stirring under a nitrogen gas stream. After the reaction, 271 g of maleic anhydride was charged at 125° C., and the reaction was completed, thereby obtaining a dispersion stabilizer I (acid value: 65, hydroxyl value: 35, number average molecular weight: 1,540) containing a polyester having carboxyl groups at both terminals.

Example 23: Synthesis of Dispersion Stabilizer J 473 g of 3-methyl-1,5-pentanediol, 850 g of sebacic acid, and 0.04 g of tetraisopropyl titanate as an esterification catalyst were charged into a four-necked flask having an inner volume of 3 liters equipped with a thermometer, a stirrer, and a reflux condenser, and the mixture was subjected to a condensation reaction for a total of 13 hours by gradually increasing the temperature to 220° C. while stirring under a nitrogen gas stream, thereby obtaining a dispersion stabilizer J (acid value: 22, hydroxyl value: 1, number average molecular weight: 4320) containing a polyester having carboxyl groups at both terminals.

Examples 24 to 27: Preparation and Evaluation of Calcium Carbonate-Containing Composition Calcium carbonate (heavy calcium carbonate, "SUPER S" manufactured by Maruo Calcium Co., Ltd.) as an inorganic filler, DINP (diisononyl phthalate) as a plasticizer, DETDA (diethyltoluenediamine) as an active hydrogen compound, a dispersion stabilizer, and a viscosity reducing agent were blended at the proportions shown in Table 5, and were stirred by a planetary stirring device (THINKY ARV-310) at 1000 rpm and 0.2 Pa for 2 minutes, thereby obtaining a paste-like inorganic filler-containing composition.

The obtained paste was evaluated for viscosity and storage stability in the same manner as described above. Results are shown in Table 5.

TABLE 5

| | | | Example 24 | Example 25 | Example 26 | Example 27 |
|---|---|---|---|---|---|---|
| Blending proportion [g] | Calcium carbonate | | 60 | 60 | 60 | 60 |
| | DINP | | 33 | 33 | 33 | 33 |
| | DETDA | | 7 | 7 | 7 | 7 |
| | Viscosity reducing agent | n-hexyl ether | | | | |
| | | Mineral spirit | | | | |
| | | Viscosity reducing agent A | | | | |
| | Dispersion stabilizer G | | 0.3 | | | |
| | Dispersion stabilizer H | | | 0.3 | | |
| | Dispersion stabilizer I | | | | 0.3 | |
| | Dispersion stabilizer J | | | | | 0.3 |
| Viscosity [mPa · s] | | | 2,300 | 1,220 | 840 | 2,400 |
| Storage stability | | | A | A | A | A |

Examples 28 to 30 and Comparative Examples 11 to 16: Preparation and Evaluation of Alumina-Containing Composition Alumina (high-purity alumina, "AKP 3000" manufactured by Sumitomo Chemical Co., Ltd.) as an inorganic filler, an alicyclic epoxy resin ("CELLOXIDE 2021P" manufactured by DAICEL CORPORATION) or a bisphenol A-type epoxy resin ("EPICLON 850-S" manufactured by DIC Corporation) as a binder resin, a dispersion stabilizer, and a viscosity reducing agent were blended at the proportions shown in Table 6, and the mixture was stirred with a planetary stirring device (THINKY ARV-310) at 1000 rpm and 0.2 Pa for 2 minutes to obtain an inorganic filler-containing composition.

The obtained composition was evaluated for fluidity and complex viscosity by the method described below, and storage stability by the same method as described above. Results are shown in Tables 6 and 7.

[Complex Viscosity]

The obtained composition was subjected to a frequency dependence measurement by a dynamic viscoelasticity measurement method using MCR-302 (manufactured by Anton Paar GmbH). To be specific, a parallel plate (diameter: 20 mm) was used, the measurement temperature was 25° C., the shear strain was 0.01%, the angular frequency was in a range of 0.1 to 100 rad/s, and the complex viscosity at an angular frequency of 1 rad/s was obtained.

[Evaluation of Fluidity]

About 0.2 g of the obtained composition was dropped onto a horizontal glass substrate with a dropper. After dropping, the glass substrate was inclined so as to have an inclination angle of 80° with respect to the horizontal, and a case where the composition on the glass substrate flowed from the glass substrate was evaluated as "A", and a case where the composition did not flow from the glass substrate but remained on the glass substrate was evaluated as "NG". Evaluation was performed at 25° C.

TABLE 6

| | | | Example 28 | Example 29 | Comparative Example 11 | Comparative Example 12 | Comparative Example 13 |
|---|---|---|---|---|---|---|---|
| Blending proportion [g] | Alumina | | 60 | 60 | 60 | 60 | 60 |
| | Alicyclic epoxy resin | | 40 | 40 | 40 | 40 | 40 |
| | Viscosity reducing agent | n-hexyl ether | | | | 1 | |
| | | Viscosity reducing agent A | | | | | 1 |
| | Dispersion stabilizer F | | 1 | | | | |
| | Dispersion stabilizer H | | | 1 | | | |
| Fluidity | | | A | A | NG | NG | NG |
| Complex viscosity [Pa · s] | | | 420 | 30 | 5214000 | 2683800 | 77630 |
| Storage stability | | | A | A | A | A | A |

TABLE 7

| | | | Example 30 | Comparative Example 14 | Comparative Example 15 | Comparative Example 16 |
|---|---|---|---|---|---|---|
| Blending proportion [g] | Alumina | | 60 | 60 | 60 | 60 |
| | Bisphenol A-type epoxy resin | | 40 | 40 | 40 | 40 |
| | Viscosity reducing agent | n-hexyl ether | | | 1 | |
| | | Viscosity reducing agent A | | | | 1 |
| | Dispersion stabilizer F | | 1 | | | |
| Fluidity | | | A | NG | NG | NG |
| Complex viscosity [Pa · s] | | | 80 | 546300 | 1550 | 680940 |
| Storage stability | | | A | A | A | A |

From the results of Tables 6 and 7, it can be seen that the viscosity reducing agent A cannot exhibit the viscosity reducing effect in the composition containing the epoxy resin.

Examples 31 and 32 and Comparative Examples 17 to 19: Preparation and Evaluation of Alumina-Containing Composition Alumina (high-purity alumina, "AKP 3000" manufactured by Sumitomo Chemical Co., Ltd.) as an inorganic filler, acetone, a dispersion stabilizer, and a viscosity reducing agent were blended at the proportions shown in Table 8, and the mixture was stirred with a planetary stirring device (THINKY ARV-310) at 1000 rpm and 0.2 Pa for 2 minutes to obtain an inorganic filler-containing composition.

The obtained composition was evaluated for fluidity and storage stability by the following methods. Results are shown in Table 8.

[Evaluation of Fluidity]

About 0.2 g of the obtained composition was dropped onto a horizontal glass substrate with a dropper. After dropping, the glass substrate was inclined so as to have an inclination angle of 80° with respect to the horizontal, and a case where the composition on the glass substrate flowed from the glass substrate was evaluated as "A", and a case where the composition did not flow from the glass substrate but remained on the glass substrate was evaluated as "NG". Evaluation was performed at 25° C.

[Evaluation of Storage Stability]

The obtained composition 12 g was stored in a 50 cc glass bottle and allowed to stand in a thermostat at 25° C. for 2 weeks.

The composition after standing was visually and tactually checked and evaluated according to the following criteria.

A: The presence of aggregates (hard cake) of the inorganic filler cannot be observed.

NG: The presence of aggregates (hard cake) of the inorganic filler can be observed.

TABLE 8

| | | | Example 31 | Example 32 | Comparative Example 17 | Comparative Example 18 | Comparative Example 19 |
|---|---|---|---|---|---|---|---|
| Blending proportion [g] | Alumina | | 60 | 60 | 60 | 60 | 60 |
| | Acetone | | 40 | 40 | 40 | 40 | 40 |
| | Viscosity reducing agent | n-hexyl ether | | | | 1 | |
| | | Viscosity reducing agent A | | | | | 1 |
| | Dispersion stabilizer F | | 1 | | | | |
| | Dispersion stabilizer H | | | 1 | | | |
| Fluidity | | | A | A | NG | NG | NG |
| Storage stability | | | A | A | A | A | A |

The invention claimed is:

1. An inorganic filler-containing resin composition comprising a resin, an inorganic filler, and an inorganic filler dispersion stabilizer, wherein the resin is one or more selected from the group consisting of polyolefin, polyester, polysulfide, polyvinyl chloride, modified polysulfide, silicone resin, modified silicone resin, acrylic urethane resin, epoxy resin, polyurethane, acrylic resin, polyester, and unsaturated polyester; and the inorganic filler dispersion stabilizer which is a polyester represented by the following general formula (1):

(1)

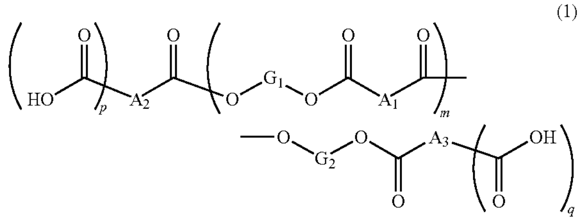

wherein $A_1$ is an aliphatic dibasic acid residue having 2 to 12 carbon atoms; $A_2$ and $A_3$ are each independently an aliphatic polybasic acid residue having 2 to 12 carbon atoms or an aromatic polybasic acid residue having 6 to 15 carbon atoms; $G_1$ and $G_2$ are each independently an aliphatic diol residue having 2 to 9 carbon atoms; m represents the number of repetitions and is an integer in a range of 1 to 20; p is an integer obtained by subtracting one from the number of basic acid functional groups of the aliphatic polybasic acid or the aromatic polybasic acid of $A_2$; q is an integer obtained by subtracting one from the number of basic acid functional groups of the aliphatic polybasic acid or the aromatic polybasic acid of $A_3$; and $A_1$ and $G_1$ may be the same or different for each repeating unit enclosed in parentheses.

2. The inorganic filler-containing resin composition according to claim 1, wherein the inorganic filler is one or more selected from the group consisting of calcium carbonate, silica, alumina, aluminum hydroxide, talc, barium titanate, boron nitride, and aluminum nitride.

3. The inorganic filler-containing resin composition according to claim 1, further comprising a viscosity reducing agent.

4. The inorganic filler-containing resin composition according to claim 3, wherein the viscosity reducing agent is one or more selected from the group consisting of a polycarboxylic acid alkyl ammonium salt, a higher fatty acid amide, a polyester acid unsaturated polyaminoamide salt, and a polyester having a carboxyl group only at one terminal.

5. The inorganic filler-containing resin composition according to claim 1, further comprising a plasticizer.

6. A molded article of the inorganic filler-containing resin composition according to claim 1.

7. The inorganic filler-containing resin composition according to claim 2, further comprising a viscosity reducing agent.

8. The inorganic filler-containing resin composition according to claim 2, further comprising a plasticizer.

9. The inorganic filler-containing resin composition according to claim 2, wherein the resin is one or more selected from the group consisting of polyolefin, polyester, polysulfide, polyvinyl chloride, modified polysulfide, silicone resin, modified silicone resin, acrylic urethane resin, epoxy resin, polyurethane, acrylic resin, polyester, and unsaturated polyester.

10. A molded article of the inorganic filler-containing resin composition according to claim 2.

11. The inorganic filler-containing resin composition according to claim 1, wherein the inorganic filler dispersion stabilizer has an acid value in a range of 20 to 400 mgKOH/g.

12. The inorganic filler-containing resin composition according to claim 1, wherein the inorganic filler dispersion stabilizer has a number average molecular weight in a range of 300 to 5,000.

13. The inorganic filler-containing resin composition according to claim 2, wherein the inorganic filler dispersion stabilizer has an acid value in a range of 20 to 400 mgKOH/g.

14. The inorganic filler-containing resin composition according to claim 2, wherein the inorganic filler dispersion stabilizer has a number average molecular weight in a range of 300 to 5,000.

15. The inorganic filler-containing resin composition according to claim 3, wherein the inorganic filler dispersion stabilizer has an acid value in a range of 20 to 400 mgKOH/g.

16. The inorganic filler-containing resin composition according to claim 3, wherein the inorganic filler dispersion stabilizer has a number average molecular weight in a range of 300 to 5,000.

17. A molded article of the inorganic filler-containing resin composition according to claim 3.

18. A molded article of the inorganic filler-containing resin composition according to claim 5.

* * * * *